United States Patent
Bigolin

(10) Patent No.: US 9,487,116 B2
(45) Date of Patent: Nov. 8, 2016

(54) VENTILATED SADDLE FOR BICYCLES, MOTORCYLES AND/OR OTHER PEDAL MACHINES

(71) Applicant: ERGOVIEW AG, Chur (CH)

(72) Inventor: Giuseppe Bigolin, Rossano Veneto (VI) (IT)

(*) Notice: Subject to any disclaimer, the term of this patent is extended or adjusted under 35 U.S.C. 154(b) by 0 days.

(21) Appl. No.: 14/419,224

(22) PCT Filed: Aug. 8, 2013

(86) PCT No.: PCT/IB2013/056482
§ 371 (c)(1),
(2) Date: Feb. 2, 2015

(87) PCT Pub. No.: WO2014/024156
PCT Pub. Date: Feb. 13, 2014

(65) Prior Publication Data
US 2015/0197171 A1    Jul. 16, 2015

(30) Foreign Application Priority Data

Aug. 8, 2012    (CH) ....................................... 1299/12

(51) Int. Cl.
| | |
|---|---|
| *B62J 1/00* | (2006.01) |
| *B60N 2/56* | (2006.01) |
| *B62J 1/18* | (2006.01) |
| *B62J 1/20* | (2006.01) |

(52) U.S. Cl.
CPC ................ *B60N 2/5664* (2013.01); *B62J 1/00* (2013.01); *B62J 1/18* (2013.01); *B62J 1/20* (2013.01)

(58) Field of Classification Search
CPC ........... B60N 2/5664; B62J 1/00; B62J 1/18; B62J 1/20

USPC ......................................................... 297/214
See application file for complete search history.

(56) References Cited

U.S. PATENT DOCUMENTS

| | | | |
|---|---|---|---|
| 654,720 A | 7/1900 | Englebert et al. | |
| 4,451,083 A * | 5/1984 | Marchello .................. | B62J 1/20 297/214 |
| 2003/0025363 A1 | 2/2003 | Gaggiola | |
| 2007/0246978 A1 | 10/2007 | Yu | |

FOREIGN PATENT DOCUMENTS

| | | |
|---|---|---|
| EP | 0353201 A2 | 1/1990 |
| EP | 1860024 A2 | 11/2007 |
| WO | WO2011033398 A1 | 3/2011 |

* cited by examiner

*Primary Examiner* — Antho D Barfield
(74) *Attorney, Agent, or Firm* — Themis Law

(57) ABSTRACT

A ventilated saddle for bicycles, motorcycles and/or other pedal driven machines, including, from bottom to top, a substantially rigid shell with a top surface shaped to support the user's body, a padding layer superimposed to the shell, a covering layer superimposed to the padding layer and designed to come into contact with the user's body. The shell has a first series of holes and the covering layer is made as a net or transpiring fabric. Connection members connect the shell to a bicycle, motorcycle and/or a pedal driven machine. The first series of holes is distributed over the entire surface of the shell, and the padding layer is a pad of elastically yielding material having a second series of holes at least partially aligned with the holes of the first series to increase the comfort of the user while seated and to promote the passage of air from the lower side of the shell to the covering layer and to the surface in contact with the user's body.

8 Claims, 6 Drawing Sheets

VENTILATED SADDLE FOR BICYCLES, MOTORCYLES AND/OR OTHER PEDAL MACHINES

FIELD OF APPLICATION

This invention is generally applicable to the technical sector of accessories for vehicles and specifically concerns a ventilated saddle for bicycles, motorcycles and/or other pedal driven machines.

PRIOR ART

Saddles for vehicles and/or pedal driven machines generally comprise f a shell made of plastic or other relatively rigid materials designed to be anchored to the frame of the bicycle or pedal driven machine and covered with a protective top layer made of leather or synthetic material. Saddles may be provided with one or more layers of padding interposed between the shell and the protective layer.

It is known that bicycle saddles are supports which transmit considerable vibrations to the body of the user during pedalling, especially in the pelvic zone and ischial bones. In fact, during pedalling the legs of the user are subject to rubbing against the cover of the saddle.

Moreover, due to the relative deformability of the covers, it is not possible to distribute the weight of the user in an optimal way. In other words, each zone of the protective layer reacts on the body of the user with a certain force of reaction which varies from point to point and differs from person to person due to weight and size.

Studies have been carried out showing that the concentrations of pressure can lead to disorders of the urinary tracts and blood vessels. To overcome these problems various types of saddles have been developed which have local padding made of various materials, and profiles or openings in the shell which in some cases are very complex. Nevertheless, although these solutions provide greater comfort for the user when seated on the saddle, they represent an obstacle to aeration of the parts subject to rubbing and causes problems such as overheating of the parts rubbed by the user.

From U.S. Pat. No. 7,059,674 a bicycle saddle is known which has a seating surface consisting of a membrane stretched over a frame in order to create a convex shape which constitutes the seating surface. The membrane is made of various materials selected from fabrics and low deformation nets in order to maintain the shape and level of tension for a certain period of time. Alternatively the membrane can be made of a sheet of elastomer material with a distribution of holes to encourage ventilation and allow water to pass, at least in part, making it practically unusable.

A problem with this known type of saddle lies in the fact that the membrane, which is fits tightly on the saddle at the beginning, is subject to deformation and in the long term it changes shape permanently and may even detach from the frame. Moreover, the membrane adapts automatically to the anatomy of the user's body and yields in the central zone.

The technical problem is therefore how to prevent the local deformation of the membrane effectively and permanently at the same time maintaining the open structure of the cover to allow ventilation in the zones of the body which subject more to overheating and allowing the passage of water and other atmospheric agents through the seating surface. Furthermore, the problem arises of how to lighten the saddle structure, increasing its comfort and lowering the barycentre of the vehicle in which it is mounted.

From US2007/0273184 a bicycle saddle including a rigid shell having an upper and lower surface is known. The lower surface is solidly joined to a fork attachment for stable connection to a seat tube. A covering element is provided on the upper surface of the rigid frame with an external surface which comes into contact with the user's body. The rigid shell and the covering element have one or more aeration holes suitably profiled and located in predetermined zones of the saddle. These holes can house a hexagonal ventilation grid and are covered by a transpiring fabric. In this way ventilation is possible over 15% to at least 50% of the entire surface of the saddle to give more effective cooling and greater comfort.

A drawback of this known saddle type is its high rigidity as the covering layer, although made of partially elastic material, is unable to compensate for the hardness of the shell. Furthermore, the ventilation produced by this structure is rather limited and concentrated in the zones of the openings and does is not evenly distributed over all the zones of the external surface of the protective layer.

WO2011/033398 disclose a bicycle saddle having a shell covered by a membrane made of a perforated partially deformable material which covers the entire surface of the saddle. The shell includes an element which pushes against the membrane from underneath and a peripheral part to block the external edge of the membrane, in addition to a stiffening element which can be anchored to the bicycle. The peripheral part of the shell is annular and has an internal edge inside which a thruster, which is mobile with respect to the peripheral element, having the function of pushing elastically against the lower surface of the membrane to oppose the deformation caused by the weight of the user.

A drawback of this known saddle type resides in the relative complexity of its structure and the fact that it requires many parts with good production tolerances and consequently a considerable addition to production costs. Furthermore, there is provided no padding and therefore the comfort when sitting is obtained exclusively from the yielding of the thrusting element which does not adapt to the anatomical conformation of the user.

PRESENTATION OF THE INVENTION

A general object of this invention is to obviate the problems mentioned above by producing a ventilated saddle which has characteristics of high efficiency and economy.

A particular object is to make available a saddle that offers diffuse transpiration over the entire zone of contact with the user's body, effectively preventing overheating and conferring a high level of comfort while the user is in the saddle.

A further object is to create a ventilated saddle which is particularly simple in its construction in order to reduce production costs.

Yet another object is to create a ventilated saddle that can be assembled easily by hand with automatic equipment without having to use adhesives or welds so that it can be recycled easily and its environmental impact can be reduced.

These objects, in addition to others that will become apparent hereinafter, are fulfilled by a ventilated saddle in accordance with claim 1. In particular, the saddle consists of a load bearing layer or substantially rigid shell with a longitudinal middle axis and an upper appropriately shaped to support the user's body, a padding layer superposed to said shell; a covering layer placed over said padding layer and designed to come into contact with the user's body, wherein said shell has a first series of holes, wherein said covering layer is shaped as a net or ventilated fabric and in which there are means of connections of the saddle to a bicycle, motorcycle and/or pedal driven machine.

The saddle is characterised in that the holes of said first series are distributed over the entire surface of said shell, and the fact that said padding layer is a pad of elastically yielding material having a second series of holes at least partially aligned with the holes of the said first series to increase the comfort when seated and to promote the passage of air from the lower part of the shell to the covering layer and, through the latter, to the contact surface with the user's body.

Thanks to this configuration, the saddle in accordance with the invention is considerably efficient and relatively cost effective.

Moreover, thanks to the coordinated arrangement of the holes in the superimposed layers, the saddle will improve the circulation and transpiration of air thereby conferring a high degree of comfort while the user is seated.

Furthermore, thanks to the particularly simplified structure, the saddle in accordance with the invention may be assembled easily with considerable reduction of production costs.

Finally, the various components of the saddle are easy to dismantle and recycle and can therefore be disposed of easily with considerable benefits in terms of environmental compatibility.

BRIEF DESCRIPTION OF THE DRAWINGS

Further characteristics and advantages of the concept will be more evident in the light of the detailed description of a preferred, but not exclusive, shape of a transpiring saddle in accordance with the invention, illustrated by way of example and not limitedly by the attached drawings as follows.

DETAILED DESCRIPTION OF AN EXAMPLE OF A PREFERRED CONSTRUCTION

With reference to the above mentioned figures, a ventilated saddle for bicycles, motorcycles or pedal driven machines, such as exercise bicycles for indoor or outdoor training is shown and generally indicated with the reference number 1.

Saddle 1 has conventionally an elongated plan shape symmetrical with respect to a vertical plane passing through a longitudinal axis L, and has a tapering front position to guide the inner thighs of the user and a wide rear portion to support the buttocks of the user.

Figure 1:
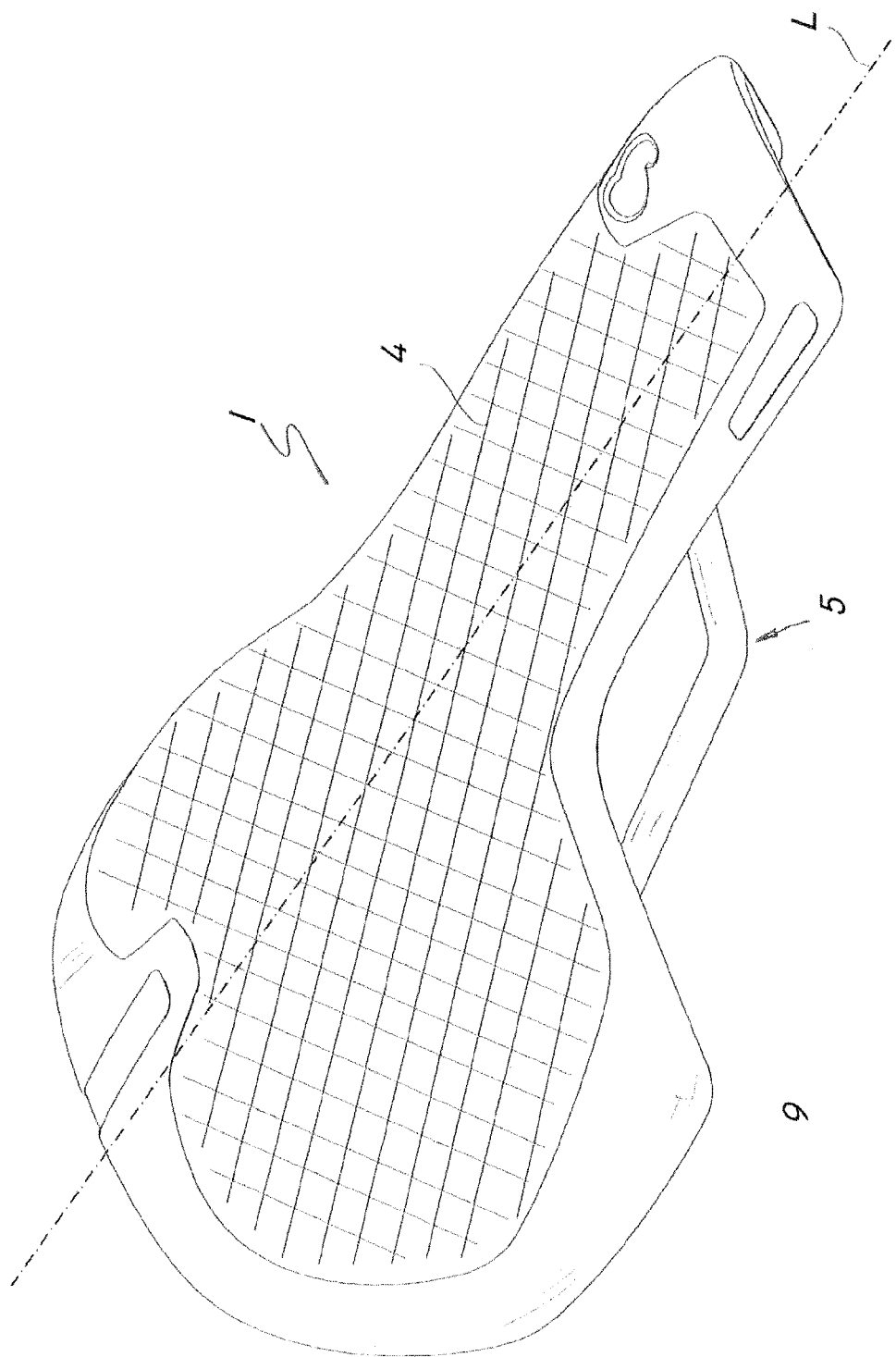
FIG. 1 is a perspective top view from above of a preferred shape of the saddle structure according to the invention.
Figure 2:
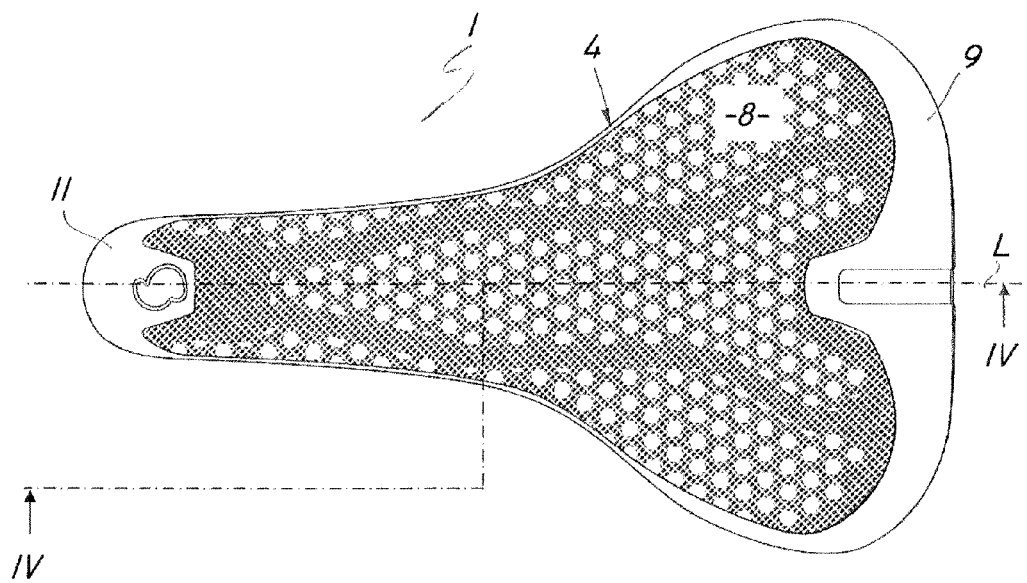
FIG. 2 is a top view of the saddle in FIG. 1.
Figure 3:
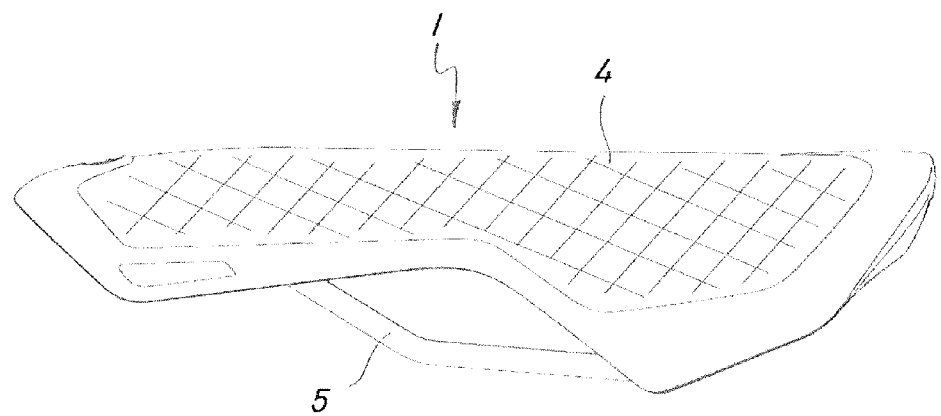
FIG. 3 is a side view of the saddle in FIG. 1.
Figure 4:
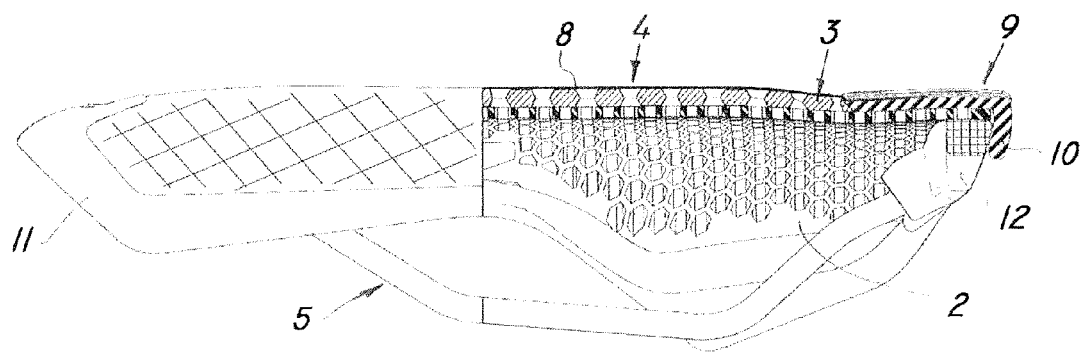
FIG. 4 is a partial section view of the saddle in FIG. 2 through the plane IV-IV.
Figure 5:
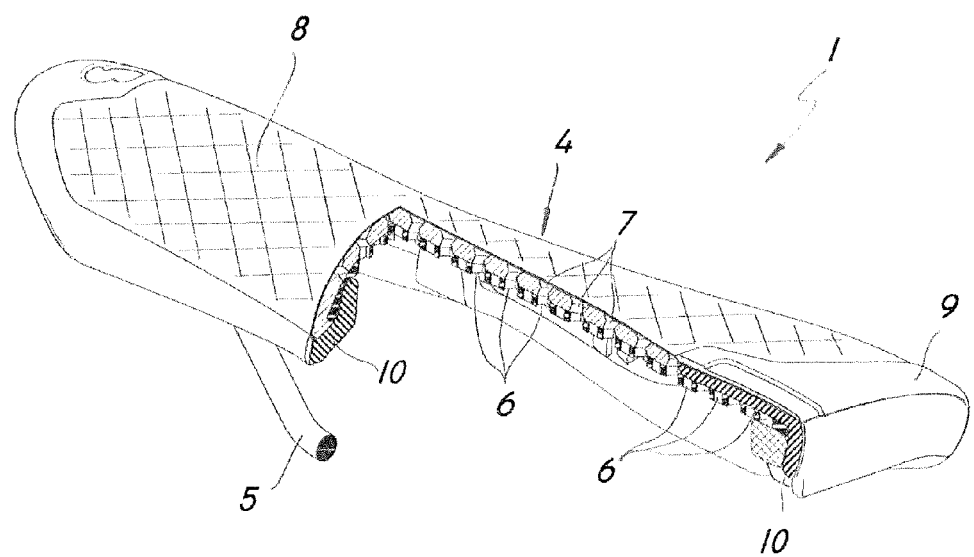
FIG. 5 is a perspective partial section of the saddle in FIG. 2.
Figure 6:
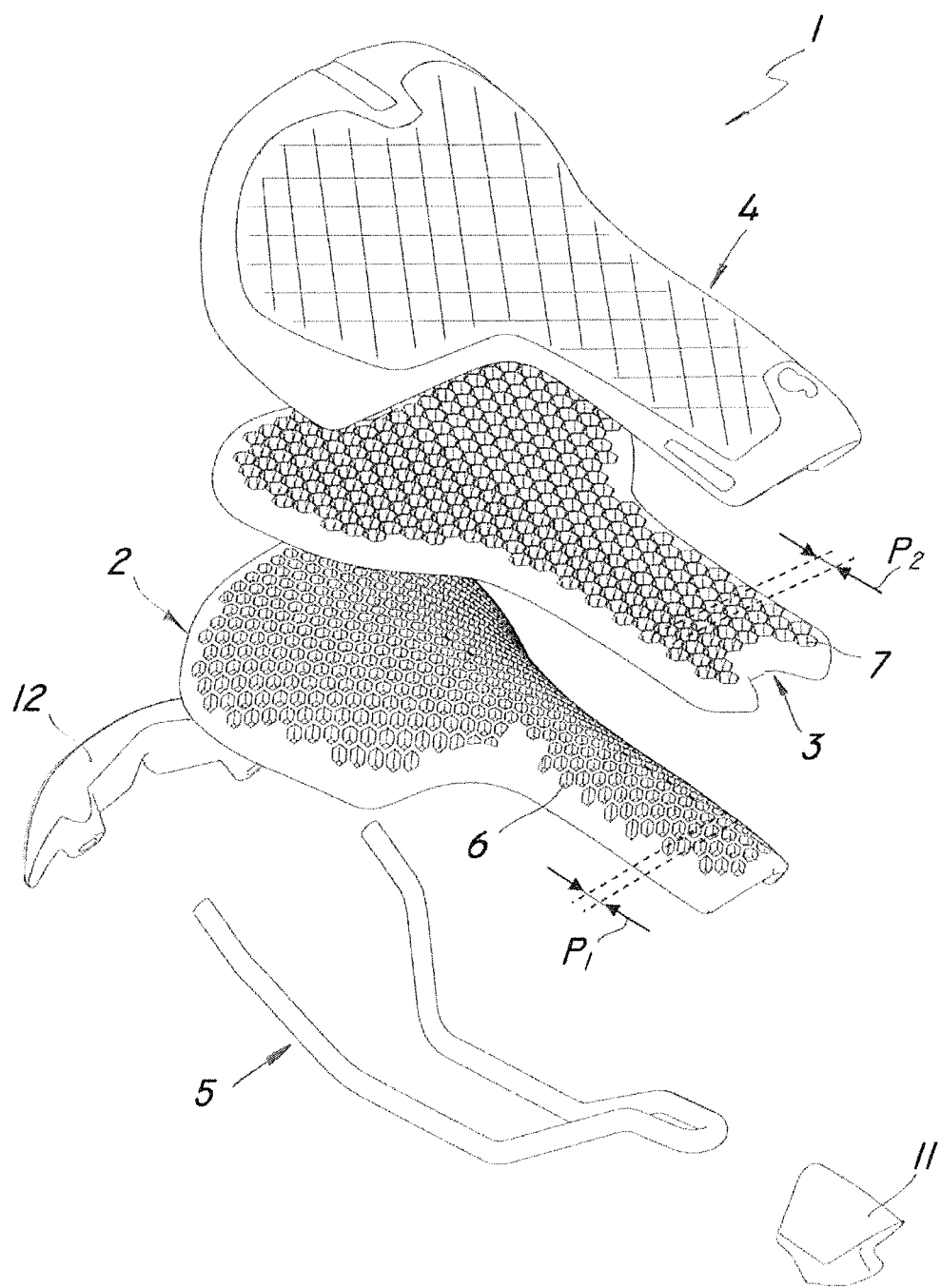
FIG. 6 is an exploded top view of the saddle in FIG. 1.
Figure 7:
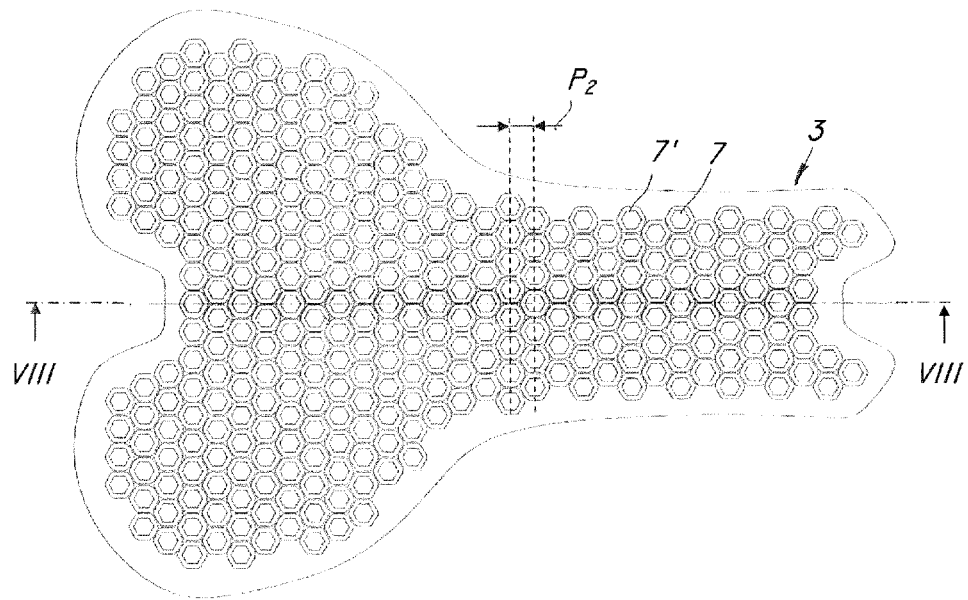
FIG. 7 is a top view of a detail of the saddle in FIG. 1.
Figure 8:
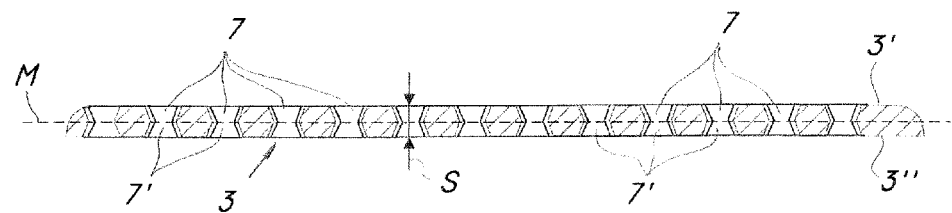
FIG. 8 is a longitudinal section of the detail in FIG. 6 partially sectioned through the plane VIII-VIII.

As better shown in FIG. 6, the saddle 1 basically comprises a number of layers reciprocally superimposed having essentially the same plan shape. In particular, from bottom to top, the saddle has a lower load bearing layer or shell 2 made of relatively rigid or semi-rigid material on which a padding layer 3 of relatively elastically yielding is superimposed which in turn is covered by a covering layer 4 which is designed to come into contact with the user's body.

The rigid or semi-rigid base material of the shell 2 is preferably synthetic and its material can be selected from the group including polypropylene, high density polypropylene, polyamide, PVC and other similar resins, which can be reinforced and/or mixed with additives, or a metal material or similar.

Means of connection to a seat post of a bicycle, motorcycle and/or a pedal driven machine, not shown in the drawings are associated with the saddle 1. In particular, the connection means overall indicated by reference numeral 5, may consist of a fork made of steel, aluminium alloy, synthetic material, carbon fibre material or similar connected to the shell 2.

Alternatively, the connection means may have a shape different from a fork, for example a bar section of synthetic or metal material.

To achieve ventilation through the saddle, the shell 2 has a first series of holes indicated generally by the numeral 6.

Moreover, the layer of covering 4 consists of a mesh or transpiring fabric which will e described more in detail below.

In accordance with the invention, the 6 holes are distributed over the entire surface of the shell 2 in such a way as to allow the passage of air through all parts of the saddle.

The padding layer 3 is a pad of elastically yielding base material, selected from the group comprising thermoplastic resins including EVA, PUR, PPE. The padding layer 3 may be obtained by injection or moulding of the base material as for any thermoplastic resin.

Figure 9:
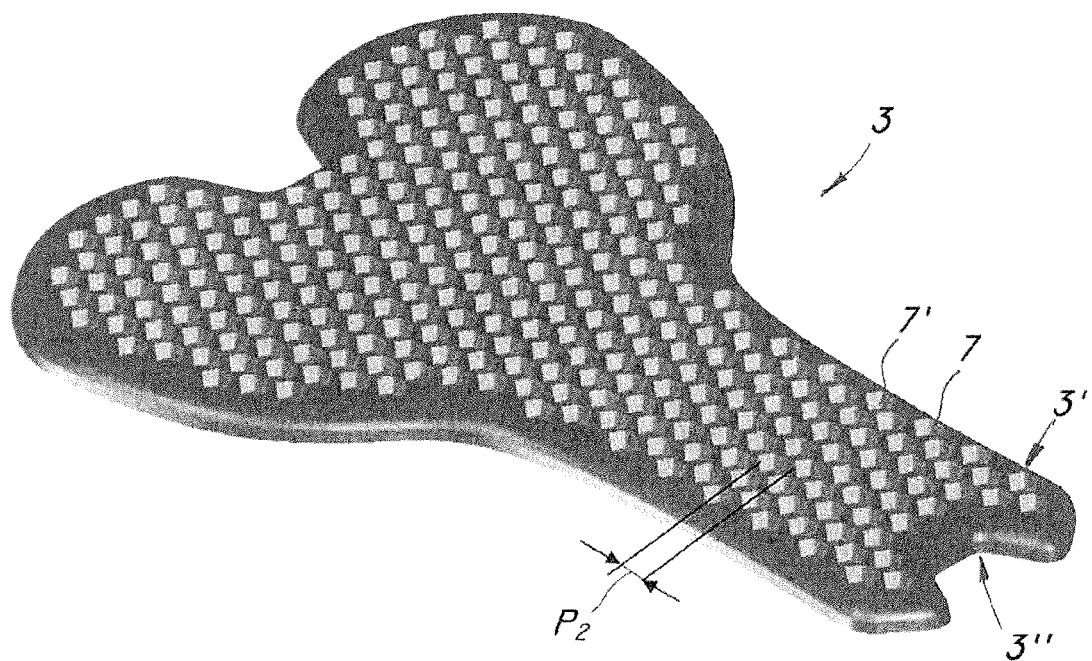
FIG. 9 is a perspective top view of a detail of the saddle in FIG. 1.

Moreover, as better shown in FIG. 9, the padding layer 3 has a second series of holes indicated by reference number 7 which will be at least partially aligned with the holes 6 in the shell 2.

In this way the padding layer 3 may better contribute to seating comfort compared with a saddle which does not have such padding but which likewise allows the passage of air from the lower part of the shell to the covering layer 4 and, through the latter, to the surface of contact with the user's body so as to reduce overheating in general of the body parts of the user subject more to rubbing and compression.

The holes 6 of the first series in the shell 2 are distributed preferably in transverse rows of adjacent holes, staggered along the longitudinal axis L by a first step $P_1$ which is substantially constant.

The holes 6 of the first series all have preferably the same transverse section which is substantially the same from bottom to top with a maximum dimension of about 3 mm. The shape of the transverse section of the holes 6 can be selected from the group of shapes which are approximately polygonal, circular, elliptical.

Similarly, also the holes 7 of the second series are uniformly distributed over the entire surface of the padding layer 3 in transverse rows of adjacent holes. The rows of the holes 7 are longitudinally staggered by a second longitudinal step $P_2$ which is basically constant.

The second longitudinal step is preferably a multiple of the first longitudinal step $P_1$, so that at least a part of the holes 7 of the second series coincide with the holes of the first series 6 and thus allow the direct passage of air through the aligned holes. The second longitudinal step $P_2$ is preferably equal to twice the first longitudinal step $P_1$.

The layer of padding 3 is suitably chosen as a pad of polymer material or similar with opposite faces 3' and 3" which are substantially flat before assembly. The pad 3 preferably has a thickness S which is basically constant between 2 mm and 10 mm which defines a median plane M equidistant from the opposing faces 3' and 3".

The holes 7 of the series preferably all have the same shape which is not cylindrical but basically a counterposed bi-conical or bi-pyramidal shape with minimum transverse section 7', preferably similar to that of the holes 6 of the first series and having a maximum diameter of around 3 mm.

The minimum transverse section 7' of the holes 7 is located preferably in correspondence of the middle plane M. In this way when the pad is compressed by the weight of the user on the upper surface 3' of the layer 3 the base material becomes denser toward the median plane where the minimum section 7' is located so as to increase the elastic modulus as the compression increases.

As to the covering layer, generally indicated with the numeral 4, it consists preferably of a central net panel 8 joined to an annular peripheral frame 9 which is substantially rigid and has an external margin 10 at least partially downwardly and inwardly folded.

By way of non limiting example, the mesh of the central panel 8 will be made with threads of average approximate diameter 1 mm, with cores of polyvinyl threads covered with polyester, or styrene covered with polypropylene. The net 8 can be single or double layer interwoven with an approximately square mesh of maximum dimension approximately 1.5 mm, inclined or parallel to the longitudinal axis L.

The peripheral annular frame 9 with its edge folded back 10 constitutes a removable coupling element 10 for the peripheral edge of the shell 2 after the padding layer 3 has been interposed.

Moreover, the outer edge 10 of the annular peripheral frame 9 also defines locking element for two end supports respectively identified by the numbers 11 at the front and 12 at the back for joining to the connecting parts 5.

In this way the various parts of the saddle can be joined reciprocally in a reversible way without the use of any adhesive or welding.

From what has been described above, it is evident that the ventilated saddle in accordance with the invention achieves all the predetermined objectives, and in particular thanks to its simplified construction provides an optimised structure which can be produced using economically advantageous methods.

Moreover, the saddle has a high degree ventilation on account of the good coordination of the holes in its superimposed layers. Once again according to the invention the saddle is extremely light and capable of providing a high degree of comfort when the user is seated. Finally, the various components of the saddle can be removed easily and recycled and are therefore easy to dispose of with notable advantages in terms of environmental compatibility.

The transpiring saddle and in particular its constituent parts can be subject to numerous modifications provided that they fall within the limits established in the claims attached herewith. All the details and in particular the materials can be substituted by other technically equivalent materials without leaving the ambit of the invention.

The invention claimed is:

1. A ventilated saddle for bicycles, motorcycles and/or other pedal driven machines, comprising, from bottom to top:
a substantially basically rigid support layer or shell (2) with a middle longitudinal axis (L) and a top surface suitably shaped to support a body of a user;
a padding layer (3) superimposed to said shell; and
a covering layer (4) superimposed to said padding layer (3) and designed to come into contact with the user's body,
wherein said shell (2) has a first series of holes (6),
wherein said covering layer (4) is made as a net (8) or transpiring fabric,
wherein members (5) are provided to connect the saddle to a bicycle, motorcycle and/or pedal driven machine,
wherein the holes (6) of said first series are distributed over an entire surface of said shell (2) including a middle portion and a peripheral portion of the saddle to enable passage of air through all parts of the saddle,
wherein the holes (6) of said first series formed in said shell (2) are evenly distributed in transverse rows of adjacent holes, longitudinally staggered by a first longitudinal step, ($P_1$) which remains substantially constant,
wherein said padding layer (3) is a layer of elastically yielding material and has a second series of holes (7) at least partially aligned with the holes (6) of said first series to increase the user's comfort while seated and to promote the passage of air from a lower side of the shell (2) to the covering layer (4) and, through the covering layer, to a surface coming in contact with the user's body, and
wherein the holes (7) of said second series formed in said Padding layer (3) are evenly distributed in transverse rows of longitudinally staggered holes with a second longitudinal step ($P_2$) which is substantially constant and approximately equal to twice a value of said first longitudinal step so that only part of the holes of the second series coincide with the holes of the first series and enable the passage of air through the aligned holes.

2. The ventilated saddle as claimed in claim 1, wherein the holes (6) of said first series formed in said shell (2) all have a same transverse section which is basically the same from bottom to top.

3. The ventilated saddle as claimed in claim 2, wherein said transverse section of the holes (6) of said first series is approximately polygonal, circular, or elliptical.

4. The ventilated saddle as claimed in claim 1, wherein said padding layer (3) is a pad of an expanded polymer material having opposite faces (3', 3") which are substantially flat before assembly or similar material and have a substantially constant thickness (S) with a middle plane (M) equidistant from the opposite faces (3', 3").

5. The ventilated saddle as claimed in claim 4, wherein the holes (7) of said second series all have the same shape which is substantially counterposed bi-conical or bi-pyramidal with a minimum transverse section (7') similar to that of the holes (6) of said first series, corresponding to said middle plane (M) so as to increase an elastic constant of said padding layer as a degree of compression increases.

6. The ventilated saddle as claimed in claim 1, wherein said covering layer (4) comprised a central net panel (8) joined to an annular peripheral frame (9) which is substantially rigid with an outer edge (10) at least partially downwardly and inwardly folded.

7. The ventilated saddle as claimed in claim 6, wherein said outer edge (10) of said annular peripheral frame (9) defines a removable joining element for a peripheral edge of said shell (2) with interposition of said padding layer (3).

8. The ventilated saddle as claimed in claim 7, wherein said outer edge (10) of said annular peripheral frame (9) also defines a locking element supporting front (11) and rear (12)

portions for said members (5), in such a manner to provide a reversible connection of the saddle parts without any adhesive or welding.

* * * * *

UNITED STATES PATENT AND TRADEMARK OFFICE
CERTIFICATE OF CORRECTION

PATENT NO. : 9,487,116 B2
APPLICATION NO. : 14/419224
DATED : November 8, 2016
INVENTOR(S) : Giuseppe Bigolin It is certified that error appears in the above-identified patent and that said Letters Patent is hereby corrected as shown below:

On the Title Page

Applicant Item (71): Replace --ERGOVIEW AG-- with --Giuseppe Bigolin, Rossano Veneto (VI) (IT)--.

Signed and Sealed this
Ninth Day of May, 2017

Michelle K. Lee
*Director of the United States Patent and Trademark Office*